United States Patent [19]

Moore

[11] 4,338,922

[45] Jul. 13, 1982

[54] SOLAR POWERED CHEMICAL PROCESSING METHOD AND APPARATUS

[75] Inventor: Walter T. Moore, Camarillo, Calif.

[73] Assignee: Veda Incorporated, Arlington, Va.

[21] Appl. No.: 816,020

[22] Filed: Jul. 15, 1977

[51] Int. Cl.³ .............................................. B23K 3/02
[52] U.S. Cl. .................................. 126/452; 126/417; 202/234; 203/DIG. 1; 159/1 S
[58] Field of Search ............................. 34/39; 423/1; 203/DIG. 1; 202/234; 159/1 S; 126/452, 417, 432, 442; 204/157.1 R, 158 R, 162 R

[56] References Cited

U.S. PATENT DOCUMENTS

| | | | |
|---|---|---|---|
| 2,133,649 | 10/1938 | Abbot | 126/271 |
| 2,636,129 | 4/1953 | Agnew | 203/DIG. 1 |
| 3,113,086 | 12/1963 | Taylor | . |
| 3,120,479 | 2/1964 | Dols et al. | . |
| 3,501,381 | 3/1970 | Delano | . |
| 3,503,865 | 3/1970 | Stone | . |
| 3,655,517 | 4/1972 | Hensley, Jr. et al. | . |
| 3,972,183 | 8/1976 | Chubb | 126/263 X |
| 3,977,952 | 8/1976 | Knoevenagel et al. | . |
| 3,985,118 | 10/1976 | Bard | . |
| 3,993,458 | 11/1976 | Antal, Jr. | . |
| 4,010,080 | 3/1977 | Tsay | 203/DIG. 1 |
| 4,010,080 | 3/1977 | Lin et al. | 203/DIG. 1 |
| 4,010,089 | 3/1977 | Stowell et al. | . |
| 4,011,857 | 3/1977 | Rice | . |
| 4,045,315 | 8/1977 | Fletcher et al. | . |
| 4,070,861 | 1/1978 | Scragg et al. | . |
| 4,076,607 | 2/1978 | Zavitsanos etal. | . |
| 4,077,849 | 3/1978 | Ziehm | 203/DIG. 1 |
| 4,135,985 | 1/1979 | La Rocca | 203/DIG. 1 |
| 4,177,120 | 12/1979 | Zenty | 204/158 R |
| 4,177,120 | 12/1979 | Zenty | . |

OTHER PUBLICATIONS

"Raindrop Production for Laboratory Watershed Experimentation", V. Chow and T. Harbaugh, Journal of Geophysical Research, vol. 70, No. 24, 12-15-65, pp. 6111-6119.

Primary Examiner—Joseph L. Schofer
Assistant Examiner—J. L. Barr
Attorney, Agent, or Firm—Finnegan, Henderson, Farabow, Garrett & Dunner

[57] ABSTRACT

An apparatus and method is disclosed for direct absorption of solar energy by material being processed whereby it is not necessary to first convert the solar energy to sensible heat in an intermediate heat exchange medium or apparatus. The material to be processed is dispersed downwardly in a chamber, or reaction vessel, in the form of small droplets, or particles, of controlled size. Solar energy entering the vessel through an elongated vertically disposed window impinges directly upon the dispersed material and energy that is not absorbed but is scattered by the dispersed material is generally intercepted by surrounding droplets or particles. Energy not so absorbed by the dispersed droplets or particles is absorbed by the vessel walls and is re-radiated to the dispersed droplets or particles. The vessel is sized so as to absorb the energy whereby the energy is re-radiated from the walls at wave lengths essentially absent from the solar spectrum at sea level due to atmospheric attenuation.

17 Claims, 11 Drawing Figures

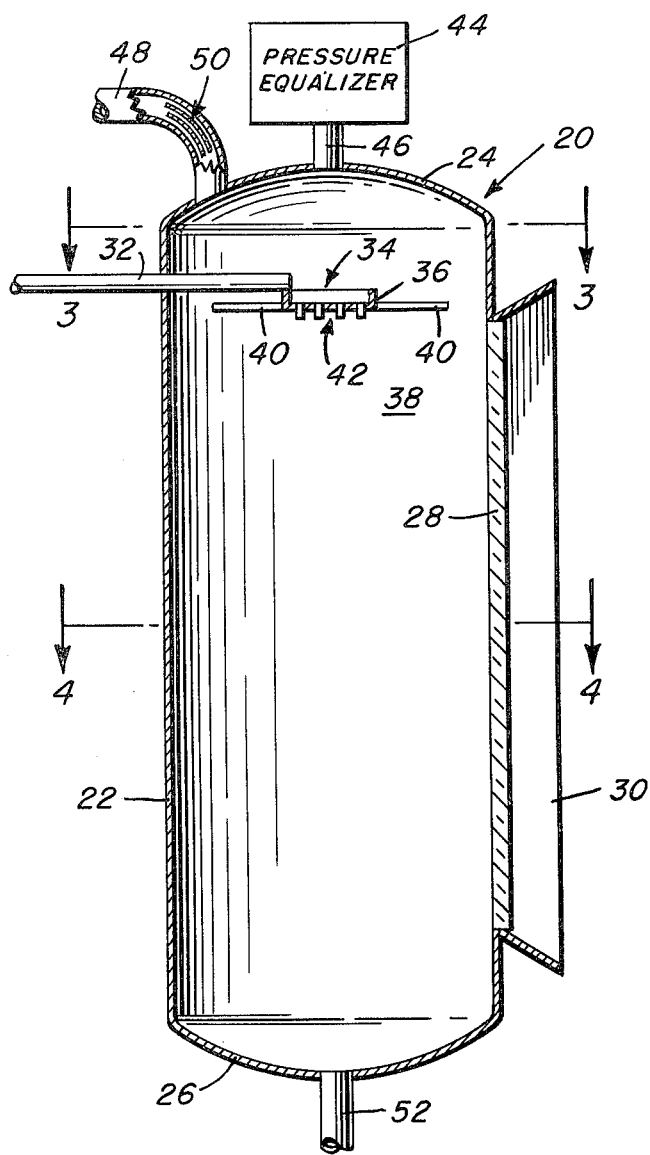
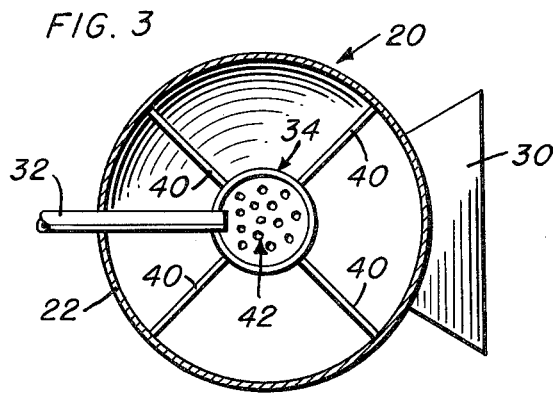
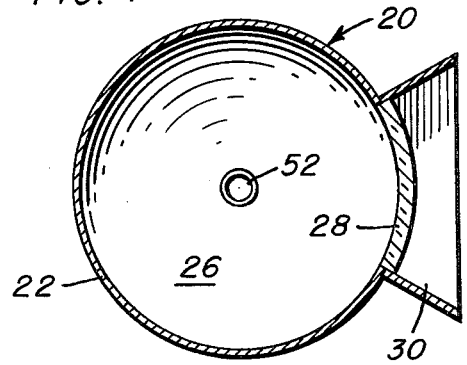

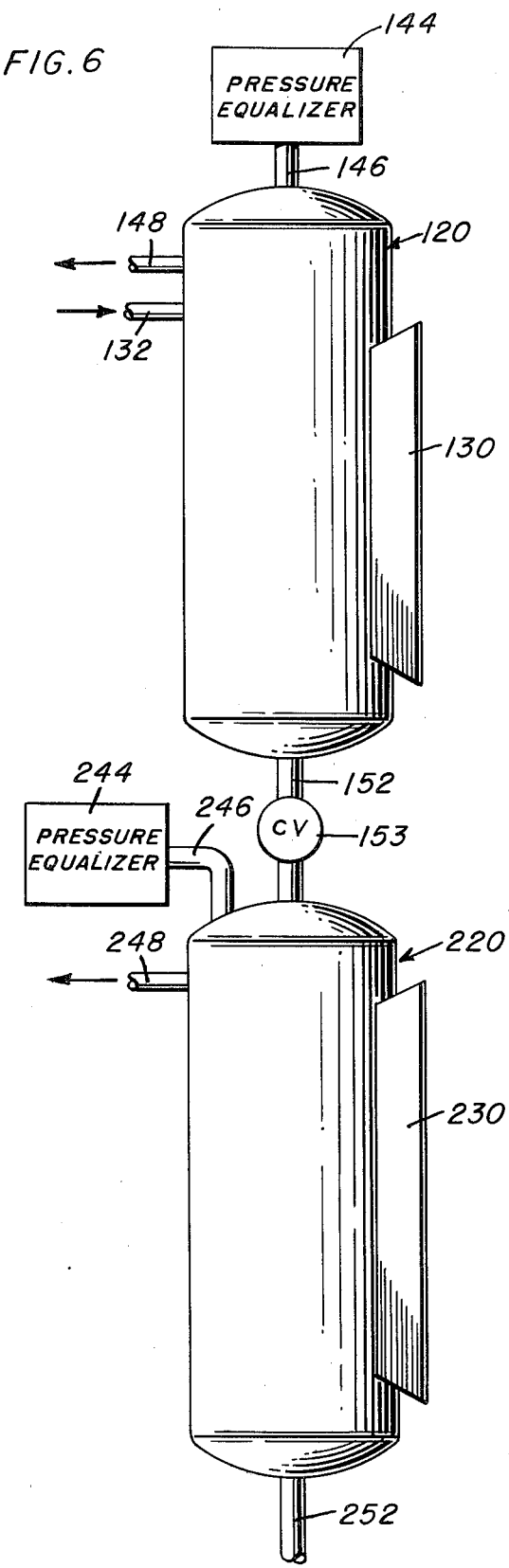
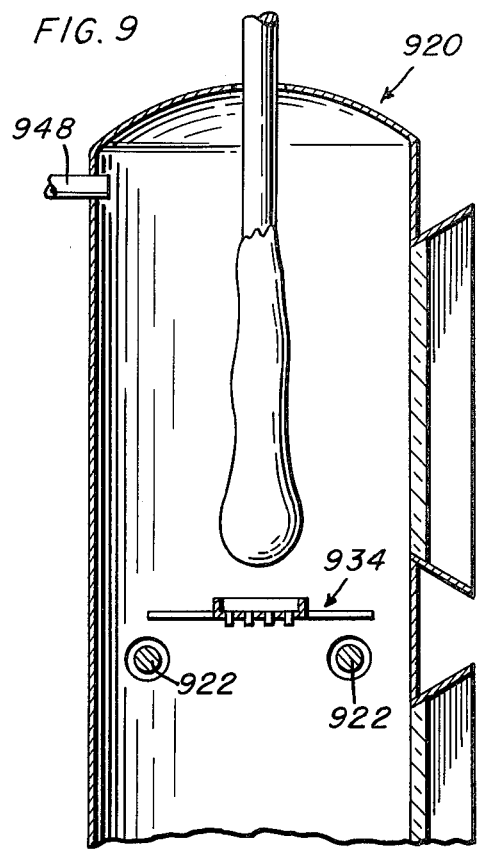
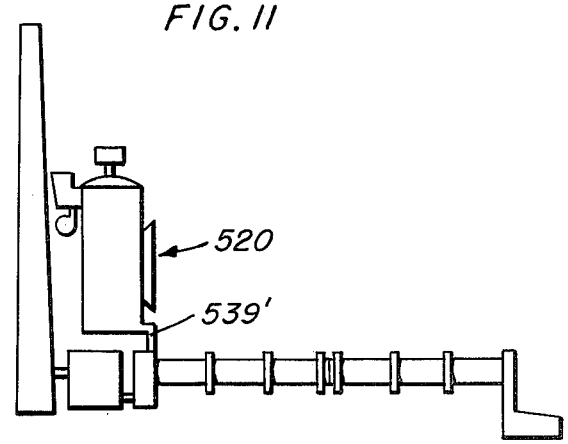

SOLAR POWERED CHEMICAL PROCESSING METHOD AND APPARATUS

BACKGROUND OF THE INVENTION

The continuing depletion of fossil and nuclear fuels may be one of the most significant long term problems facing the world. There is considerable disagreement regarding the size of the depletable fossil and nuclear fuel resources. Thus, increasing interest is now centered about renewable energy resources such as solar energy.

The collection and concentration of solar energy for utilization in solar furnaces is well known in the art. Until relatively recently such solar furnaces were for the most part adapted for the heating of a fluid, generally a liquid such as water, for the production of steam for utilization in industrial processing and turbogeneration of electricity.

For the most part, the body of liquid being heated by solar energy in the prior art devices is contained within a horizontally disposed at least partially light transmissive conduit or in a tower top boiler situated at the focal point of a distributed heliostat field. While it is appreciated that the prior art contemplates solar fueled furnaces comprising a generally vertically disposed conduit for the heating of a body of fluid, generally liquid and more particularly water, and also contemplates the provision of solar fueled furnaces, such as may be used for melting of metals or alloys, having generally vertically disposed solar energy entry windows, which may or may not include a transparent solid windowpane, such apparatuses and methods of utilizing the same have heretofore not generally been suitable for large scale industrial applications.

High purity water for industrial use, potable water and agricultural water are increasingly in short supply. A new fresh water source would be advantageous to all of these uses. Utilizing prior art apparatuses and methods, waste water recovery and purification, including treatment of saline or brackish water, is both expensive and energy intensive. In addition, previously proposed apparatuses and methods for the thermolytic processing of materials, in addition to the aforementioned processes, such as for the calcining of solids, removal of water of crystallization from a solid crystalline matter, energy storage, and food processing either for sterilization or drying, to name a few processes, have not generally been sufficiently efficient to be cost effective so as to be competitive, or potentially competitive, with fossil fueled systems.

In one apparatus disclosed in the prior art an attempt is made to maximize the absorption of solar energy in a directly heated tower top solar furnace, primarily intended for the production of synthesis gas, by directing collected and concentrated solar energy to the light transmissive bottom of a fluid jacket of a solar furnace for the generation of steam that is passed upwardly through a second light transmissive wall for the injection of the steam into an inner chamber of the solar furnace for fluidizing a bed of carbonaceous material and providing the necessary water and heat for carrying forward the reaction for the production of synthesis gas.

As the description of the present invention proceeds, it will be apparent that the present invention is readily distinguishable from the above discussed prior art apparatuses and methods.

SUMMARY OF THE INVENTION

At the heart of the present invention is a directly solar fueled processor vessel and method of maximizing efficiency of the same for carrying forth a multitude of thermolytic physical and chemical processes.

It is therefore the main purpose of this invention to provide an apparatus and a method of utilizing concentrated solar energy for inducing a chemical reaction or physical change in a material. In general, in the apparatus of the present invention, utilizing the method disclosed, the material will be directly exposed to the radiant energy without the radiant energy first being converted to sensible heat in an intermediate heat exchange medium. However, it is to be understood that the ancillary use of intermediate heat exchangers in addition to utilization of the apparatus and method of the present invention may optionally be used in systems incorporating the teachings of the present invention.

While the specific means for collecting, concentrating, and directing solar energy to an apparatus constructed in accordance with the present invention for carrying out the inventive method disclosed herein, does not per se comprise a part of the present invention and may in fact comprise any of a plurality of state of the art devices, a preferred apparatus for the collection and concentration of solar energy is the subject of a copending application in the name of the present inventor, which has now issued as U.S. Pat. No. 4,137,897.

While the present invention is primarily discussed with respect to the desalination of brackish or sea water it will be appreciated as the description proceeds with greater particularity that utilization of an exemplary apparatus utilized for carrying forth a method of desalinization is merely exemplary of numerous thermolytic processes that may be carried forth using exemplary embodiments of the apparatus of the present invention.

Broadly, a solar fueled device in accordance with the present invention operates by direct absorption of radiant energy into drops of saline water exposed to concentrated solar energy and high intensity energy radiated from the walls of an insulated evaporator chamber, or vessel. The chamber walls will become heated by absorption of that part of the solar energy not absorbed while passing through the water drops. Means are provided within the vessel to produce a "rainfall" many times more intense than occurs in nature, and a rapid evaporation from the surface of each drop occurs. The resultant low temperature, low pressure steam is removed from the evaporator vessel to a separate chamber where it is condensed to provide desalinated water as the main product output while transferring its energy, as a primary energy source to the saline water entering the system, which is preferably a multiple effect evaporator system, the present invention being one or more of the stages thereof.

Further, the apparatus and method disclosed herein is an approach to the use of solar energy which enables carrying forth selective distillation. Highly concentrated solar energy impinges on a very dense column of discrete water drops being dispersed downwardly through the vessel as a rainfall. Part of the solar energy is directly absorbed in the water drops, and additional energy passing through the drops, or re-radiated thereby, impinges upon other drops resulting in further absorption of solar energy. The remainder of the solar energy, save that which may incidentally be re-radiated through the entry window of the vessel, is scattered to the walls of the vessel. It is a significant aspect of the present invention that the scattered energy is absorbed in a manner whereby it is re-radiated by the walls acting essentially as a black body at a temperature in the range of about 1000° to 1300° Kelvin (1341° to 1881° F.). Such temperatures may be achieved, for example, by lining the chamber with an insulating fire brick such as used in medium temperature industrial kilns. A surface suitable for exposure to the high humidity as a result of evaporation should be readily attainable, either as a glaze or ceramic face on the insulating brick.

Thus, a preferred exemplary embodiment of an evaporator chamber or vessel in accordance with the present invention for carrying forth the method of the present invention may be generally characterized as an elongated vertically disposed insulated chamber with an elongated vertically disposed entry window highly transparent to the normal solar energy band, which window is sufficiently strong to withstand the low pressure differential between pressure inside the operating evaporator and ambient air.

Due to the high flux of radiant energy at the window, it may be necessary to cool it with a suitable liquid flow through or across the window surfaces. At the center of this vessel, generally concentrically disposed with regard to the path of the incoming concentrated solar energy, or approximate focal point thereof, is the aforedescribed heavy rain column of dispersed material falling downwardly therethrough. The scattered portion of the incoming energy, as discussed above, will exit the rain column in a very diffuse form to be absorbed in the chamber walls, appearing as sensible heat in the wall. In order to permit appropriate temperature of the wall to handle the desired energy flux and facilitate re-radiation in the aforedescribed wave lengths generally equivalent to those attenuated during passage through the atmosphere, the inside diameter of the wall of the vessel will generally be in the order of two to four times the diameter of the rain column.

The evaporated material will generally be recovered in a condensed form. In the multiple effect evaporator, condensation of the evaporate is done in such a manner that a large portion of the energy in the hot gas is transferred to the imcoming material in order to more efficiently utilize the energy input to the system. The movement of evaporate to the condenser may be performed by several methods.

Airflow, controlled by fans, for example, may optionally be utilized to circulate dry air into the evaporator vessel to entrain the water vapor enroute to the condenser. The dried air may then be returned from the condenser to the evaporator and condensation of the water vapor will transfer the energy in the steam to incoming saline water which is enroute to the means for producing the dispersion of downwardly falling drops within the vessel.

In summary, it will be appreciated that thermolytic processing of material, be it liquid or particulate solid, takes place in an upright generally cylindrical vessel, in which the longitudinal axis of the vessel is generally vertical with respect to the gravitational field. The material to be thermolytically processed enters the vessel adjacent the top and is dispersed by suitable means to distribute it as a dispersion of liquid droplets or fine particles as a "rainfall" to enable carrying forth the process desired. The concentrated solar energy enters the vessel through the vertically disposed entry window in a vertical wall of the vessel and is distributed as desired over the horizontal width and vertical length of the window space which is generally in the magnitude of a "slit". In general, the slit window is closed to the atmosphere by a material transparent to the radiant energy in the 0.2–2.8 micron band and the window is strong enough to withstand whatever internal pressure and other stresses it may be required to withstand, such as structural forces and radiant intensity.

The side walls of the vessel will by virtue of the sizing of the vessel be set back somewhat from the expected beam space in order that the intended reaction will occur without the material being processed coming in contact with the wall surfaces. In order to protect the interior of the cavity of the vessel from becoming overheated in the event that concentrated sunlight is present without a dispersion of material being present in sufficient quantity to absorb the energy, the wall opposite the window is preferably configured such that it will return the incident energy back through the slit entry window.

It will be appreciated that this may be accomplished in a variety of state of the art ways, such as by curvature to make its reflective surface perpendicular to the incident energy. In addition, suitable temperature control treatment of the interior walls may consist of reflectivity/emissivity control surfaces, insulation, and/or cooling by radiation or conduction to the outside of the vessel or by means of heat exchangers for the exchange of the heat, in a heat sink fashion, to other material.

It will be appreciated from the foregoing that the structure housing the aforedescribed thermolytic reaction cavity within the vessel may serve other purposes than merely to provide structural strength and closure. In order to make maximum use of the intercepted solar energy it would be desirable to control the energy flow to leave only a minimum amount of energy in the effluent material, either in the evaporated or non-evaporated material or material treated by some other thermolytic process such as in conjunction with calcining, chemical conversion for energy storage, etc.

Since many processes benefit from preheating of the material being fed to the reaction chamber of the vessel, most of the effluent sensible heat could be transferred to this incoming material through suitable heat exchangers conventionally utilized in the art. In this case, the heat exchangers may be incorporated into the structure in such a manner that the resulting structure may readily be designed into a conventional structural enclosure, or building, with the entry window to the cavity being located in one wall. Further, it will be understood, although not in a limiting sense, that an apparatus constructed in accordance with the principles of the present invention may be utilized in carrying forth a substantial number of thermolytic processes as characterized in the following table.

| General Process | End Products/Process Involved |
|---|---|
| Desalination | Distilled Water |
| | Minerals |
| | Isotope Concentrates |
| Materials Drying | Water bearing particulates - such as clay or sand or other "Wet" particulates - such as paint pigments requiring evaporative drying or removal of water of crystallization. |
| | Chemical decomposition - such as CaOH to CaO and $H_2O$ |
| | Calcining cement, clays, etc. |

| General Process | End Products/Process Involved |
| --- | --- |
| Food processing | Sterilization of liquids such as milk<br>Powdering solutions such as milk or eggs<br>Grain drying |
| Fractional Separation | Petroleum products<br>Coal gasification or liquefaction |

DESCRIPTION OF THE DRAWINGS

FIG. 2 is an enlarged vertical cross-sectional view of the vessel of FIG. 1 schematically showing certain interior details thereof and including vapor off-take and demisting means;

FIG. 3 is a horizontal cross-sectional view taken along the line 3—3 of FIG. 2;

FIG. 4 is a horizontal cross-sectional view taken substantially along the plane of the line 4—4 of FIG. 2;

FIG. 6 is a perspective view of still another embodiment of a directly heated solar processing apparatus constructed in accordance with the present invention wherein the apparatus comprises two directly heated solar processing vessels connected in series;

FIG. 9 is a fragmentary vertical cross-sectional view of an apparatus somewhat analogous to the apparatus of FIG. 8 and further including means for collecting a solidified constituent of material being processed by means somewhat analogous to that illustrated in FIG. 7;

FIG. 11 is a schematic representation of a fossil fueled calcining and high temperature kiln provided with a directly heated solar processing vessel generally analogous to that illustrated in FIG. 5 as comprising an auxiliary means for augmenting the heating of material being fed to the rotary kiln.

DESCRIPTION OF THE PREFERRED EMBODIMENTS

Figure 1:
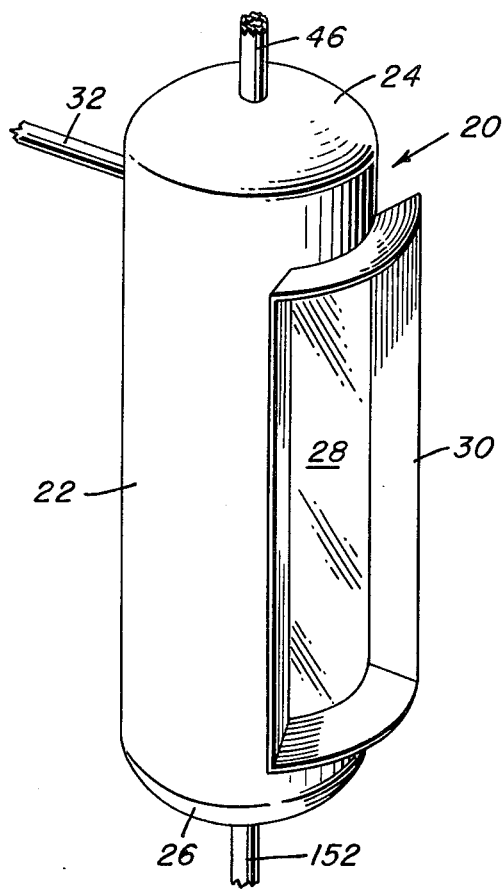
FIG. 1 is a perspective view of a preferred embodiment of a directly heated solar processing vessel constructed in accordance with the present invention.

Turning now to a simultaneous consideration of FIGS. 1 through 4, a solar energy heated processor chamber or vessel indicated generally at 20 comprises a generally elongated cylindrical wall portion 22 provided with upper and lower integral end bells 24 and 26 respectively. The processor 20 for reasons that will become more apparent as the description proceeds, in use is generally vertically disposed and provided with at least one elongated vertically disposed generally rectangular aperture closed by a "slit" window 28 of a material that is substantially transmissive, at least with respect to radiant energy in the 0.2 to 2.8 micron band, and strong enough to withstand whatever internal pressure and other stresses it may be required to withstand, such as structural forces and radiant intensity. Although the window is shown and described as being rectangular it will be understood that it may be of other than rectangular peripheral configuration as long as the vertical extent thereof is sufficient so as to permit the entry of sufficient solar energy within parameters to be discussed. As shown, in preferred embodiments of the invention the processor vessel is provided with means 30 comprising solar beam wander deflectors that generally correspond to the peripheral configuration of the window 28 and diverge somewhat outwardly therefrom to assist in ensuring that solar energy collected and concentrated, by means not shown, will be directed into the window 28 in the event the focus of the collector and concentrator means is slightly off target.

Material to be processed, which in the instance of the processor 20 of FIGS. 1 through 4 would generally comprise a liquid, such as saline water to be subjected to desalinization through selective vaporization, is introduced through conduit 32 into a dispersion producing means indicated generally at 34 as seen best in FIGS. 2 and 3. The dispersion producing means 34 generally comprises a pan 36 supported from the interior side walls 38 of the vessel 20 by suitable support members 40 such as comprising a "spider" that does not significantly interfere with fluid flow upwardly past the dispersion producing means.

The pan 36 of the dispersion producing means 34 is provided with a plurality of apertures fitted with vertically disposed relatively small bore tubes as generally indicated at 42. It will be understood that for purposes of illustration only a relatively few of the tubes are illustrated and that a relatively large number of such tubes will be provided so as to enable the formation of a significant number of drops of saline water so as to establish a liquid-in-gas dispersion of droplets of saline water that fall downwardly through the interior of the vessel 20 where they are acted upon by solar energy entering the vessel 20 through the window 28.

Reference is made to the Journal of Geophysical Research, Volume 70, No. 24, Dec. 15, 1965, pages 6111 through 6119 with respect in the article entitled Raindrop Production for Laboratory Watershed Experimentation, authored by Ven Te Chow and Terence E. Harbaugh with respect to a technically efficient method for producing artificial raindrops which method is exemplary of that which may be utilized with respect to the dispersion producing means 34 and particularly the tubes 42 utilized therein. Although not readily apparent by virtue of the scale of the drawings, the vertically disposed small bore tubes indicated generally 42 extend upwardly above the bottom interior surface of the span 36 so as to ensure that the upper end of each respective tube is subjected to at least a minimum head to insure a desired flow.

It will thus be seen that the material to be processed entering the reaction chamber through the conduit 32 and being dispersed by the means 34 is distributed downwardly through the chamber wherein concentrated solar energy enters the chamber through the window 28 and distributed over the horizontal width and vertical length of the window space 28.

The diameter of the vessel wall 22 is sized so that the intended reaction, in this case vaporization of the saline water, will occur without the saline water being processed coming in contact with the inner surface 38 of the chamber.

Although not previously discussed, the processor vessel 20 is either produced of a thermally insulating material or covered with such material so as to minimize thermal loss from the interior outwardly thereof.

As schematically shown in FIG. 2, the processor vessel 20 is provided with pressure equalizer means 44 in communication with the interior of the top of the vessel through conduit 46, which pressure equalizer is provided to enable equalization of pressures within and without the vessel during start-up and shutdown.

As will be readily apparent as the column of dispersed saline water droplets "rain" downwardly from the dispersion producing means 34 and are acted upon by solar energy vaporization occurs and water vapor is drawn off through a vapor outlet conduit 48 provided with de-mister means indicated generally at 50 to effect removal of liquid droplets undesirably entrained with the water vapor being discharged through conduit 48. It will be appreciated that the relative placement of the particular conduits 32, 46 and 48 is merely exemplary and that they can be positioned other than illustrated so long as the positioning thereof is consistent with the desired result. In this regard, specific attention is directed to the fact that to avoid premature heating of the saline water entering through conduit 32 such as might interfere with proper formation of the liquid phase of the liquid-in-gas dispersion, the dispersion producing means 34 is positioned above, i.e., out of the path of solar energy entering through the window 28. Since the water vapor being discharged through the conduit 48 is condensed by means conventional in the distillation art it is not considered necessary to illustrate or further discuss such means. Similarly, concentrated saline slurry is discharged from the bottom of the vessel 20 through conduit 52 to waste or other suitable utilization for recovery of constituents thereof. It will be understood that, although not shown, saline slurry being discharged through conduit 52 may in fact by means conventional in the art be passed in heat exchange relationship with saline water being introduced into the processor vessel 20 through the conduit 32.

Thus essentially, with respect to the figures discussed above the processor vessel 20, described as a desalinator, operates by direct absorption of radiant energy into drops of saline water exposed to concentrated solar energy and high intensity energy radiated from the walls of the insulated evaporator chamber. The chamber walls will become heated by absorption of that part of the solar energy not absorbed while passing through the water drops. The drops appear in the evaporator chamber as a rainfall many times more intense than occurs in nature. The specific mechanics of the production of this rainfall is discussed in greater detail in the above referenced literature reference which as indicated above comprises a state of the art means of establishing such an artificial rainfall.

Merely by way of illustration assuming a 15 MW input through the window 28 the exemplary dimensions of the processor vessel 20 would comprise an interior diameter in the order of 3–5 meters and the vessel would be in the order of 3 meters high and wherein the dispersion producing means 34 would produce a dispersion of downwardly falling drops of saline water wherein the drops have a radius of about 1 mm and wherein the inner walls 38 of the vessel operate at a temperature as discussed above to re-radiate initially non-absorbed radiation in a spectrum band generally analogous to that normally attenuated by the atmosphere.

Turning now to a description of FIG. 6 it will be seen that two processor vessels 120 and 220, which will be understood to be substantially analogous to the processor vessel indicated generally at 20, are operatively connected in series wherein the conduit 152 discharges relatively concentrated saline effluent preferably of such a concentration that the salt just remains in solution and is passed downwardly into vessel 220 and wherein check valve 153 is interposed in the line 152 to preclude upward flow of vapors from the vessel 220. As with the vessel 120 the vessel 220 is provided with a pressure equalizer means 244 in communication with the interior of the vessel 220 by means of the conduit 246. Further, the conduit 248 is provided for removal of vapors discharging from the vessel 220. Although not shown, it will be appreciated that the conduit 152 discharging concentrated saline slurry from the vessel 120 into the vessel 220 discharges into a dispersion forming means analogous to the means 34. Alternatively, as will be discussed in greater detail with respect to other exemplary embodiments of the invention, the vessel 220 may selectively be provided with a dispersion producing means that is constructed so as to enable the creation of a particulate solid-in-gas dispersion of material to be passed downwardly through the vessel 220 such as would be the case with respect to a saline slurry of salt crystals and a minor amount of carrier liquid.

Turning now specifically to FIG. 10 the processor or vessel indicated generally at 320 will be understood to be substantially analogous to the processor vessel 20 of FIG. 1 and comprises the primary point of energy input into a multiple effect humidification desalinator indicated generally at 322. Saline water enters the packed tower 316 through conduit 315 and its associated pump. The heat from the evaporate is transferred through the heat exchanger walls indicated generally at 351 to the incoming relatively cold saline water. The heated saline water emerging from conduit 315 is then dispersed over the packing material in the tower 316. The packing material provides a large surface over which the water is diffused, and wherein the high energy water molecules are evaporated and picked up by the circulating airstream to be removed from the packed tower through conduit 317. The cooler molecules collect at the bottom of tower 316, and are removed through conduit 321 as a liquid. Pump 323 then passes this cooled liquid into the condenser 318 where energy is picked up from the circulating airstream through the heat exchange surface 319. The hot liquid then leaves the condenser through conduit 325.

The circulating airstream from duct and fan 326 enters the bottom of the packed tower 316 as warm dehumidified air. It then passes counter-flow to the liquid in the tower, extracting energy from the liquid in the form of water vapor. The airstream then passes to condenser 318 via duct 317 as high humidity hot air. The energy in the water vapor is removed by condensation on heat exchange surface 319. The condensate is removed at the bottom of condenser 318 as fresh water. The warm "dry" air then re-enters the packed tower 316 by duct and fan 326.

Figure 10:
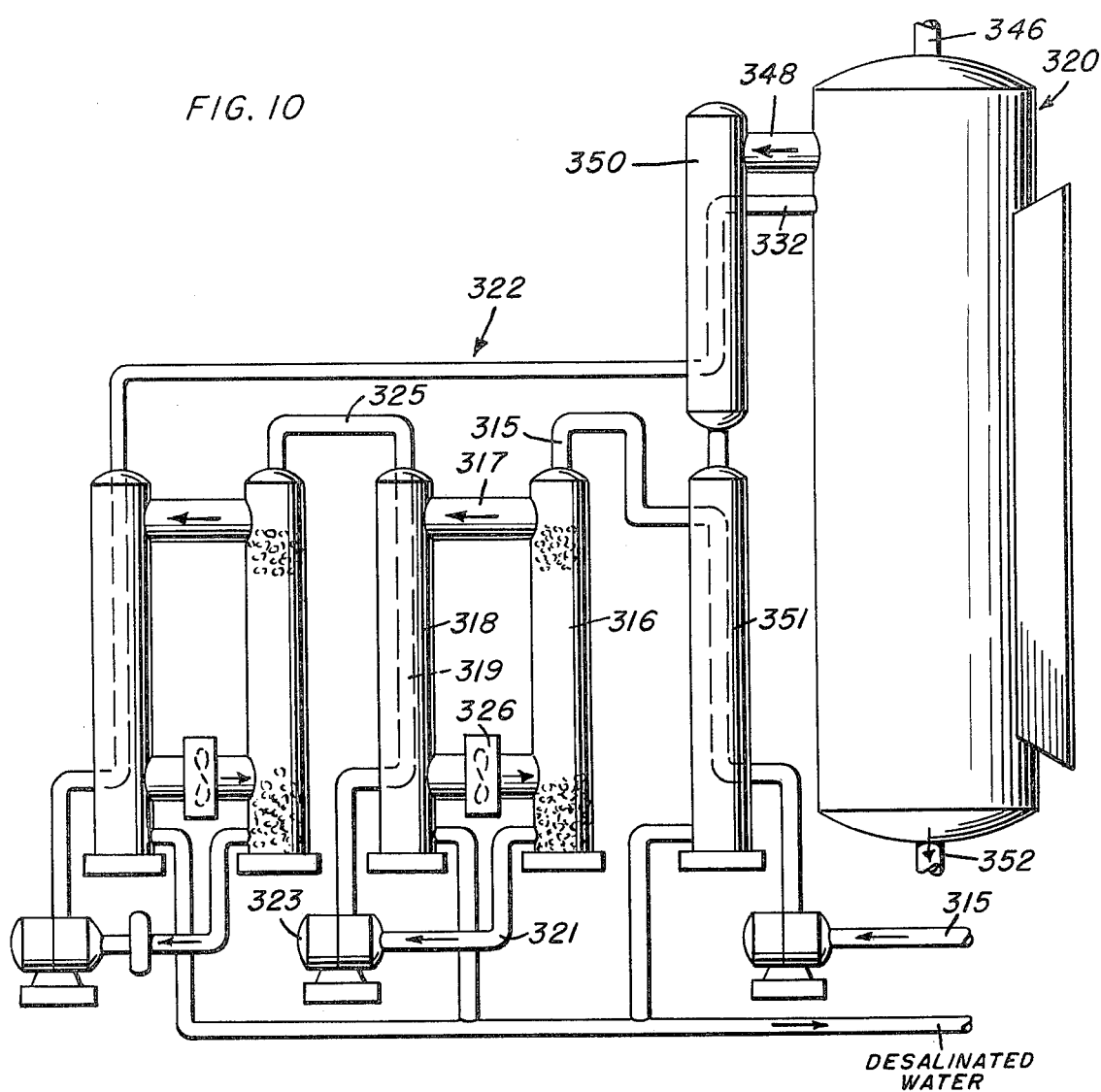
FIG. 10 is a side elevational view of a directly heated solar processing vessel substantially analogous to that illustrated in FIG. 1 shown operatively connected to a multistage apparatus particularly well suited for the desalinization, and the like of water.
Figure 7:
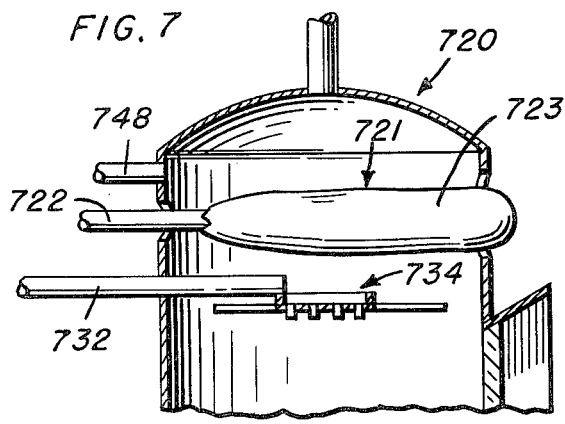
FIG. 7 is a fragmentary vertical cross-sectional view of a further embodiment of a directly heated solar processing vessel constructed in accordance with the present invention and provided with means for collecting and withdrawing a solid condensate from the upper portion of the vessel being utilized to carry forth a thermolytic process.
Figure 8:
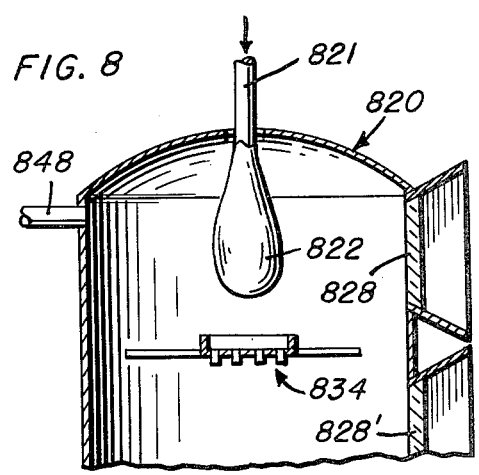
FIG. 8 is a fragmentary vertical cross-sectional view of still another embodiment of a directly heated solar processing vessel constructed in accordance with the present invention primarily adapted for the solar energy melting of a bar feed stock whereby the material so melted is dispersed downwardly as droplets of controlled size and subjected to thermolytic processing and where it will be seen that the exemplary vessel of FIG. 8 is provided with at least two solar energy entry windows.

In FIG. 10 it will be seen that the equipment is cascaded with equipment similar to that just described, prior to entering the processor 320. It will be appreciated that the cascading, or multiple staging, will generally be necessary in order to efficiently utilize the energy available. While a considerable number of stages can be cascaded it appears that cascading of approximately twelve stages is all that is generally required to maximize cost effectiveness.

As the incoming saline water entering through conduit 315 passes through each stage of humidification the temperature at the exit of the respective condensers will be near the temperature of boiling water. At the entry to the dispersion producing means, not shown within the vessel 320, it is expected that the saline solution will be at several degrees of superheat, and that it will be concentrated by perhaps 20 to 70% from its input state. Concentration by 90%, or more, is expected to be completed in the processor vessel 320, with a residual saline solution, 10%, or less, of the input at 315, being removed from the processor at 352.

Note that no fans are shown circulating air through the evaporative processor vessel 320 and the last-stage preheat/first-stage-condenser 350. Forced circulation may be required, but it appears that the rapid evaporation in the presence of concentrated sunlight entering the processor 320, and condensation and heat exchangers 350 and 351 may be sufficient to provide the desired flow rate of water vapor, while conduit 346 and its associated pressure equalizer means, not shown, will provide any necessary pressure equalization with the outside atmosphere.

Figure 5:
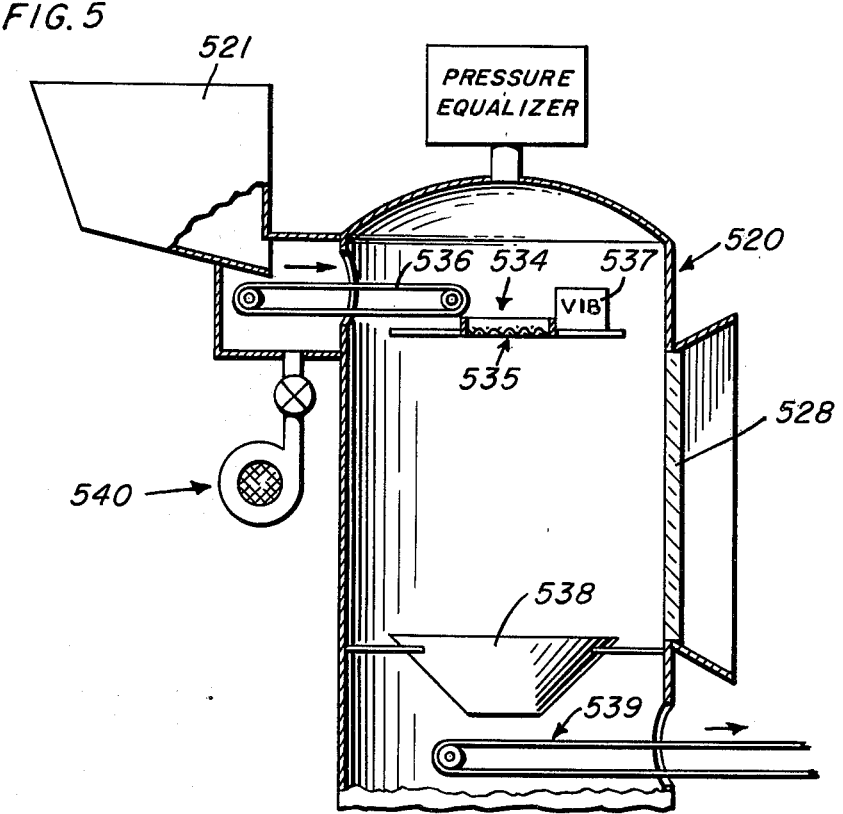
FIG. 5 is a vertical section of another embodiment of a directly heated solar processing vessel constructed in accordance with the present invention.

Turning now to FIG. 5 it will be seen that the processor vessel 520 is adapted for the thermolytic processing of a particulate material such as stored in supply bin 521 and fed into a solid-in-gas dispersion means 534 provided with an apertured plate or screen indicated generally at 535 receiving particulate means by endless conveyor belt means 356 and wherein the particles so received are caused to pass through the perforate means 535 with the assistance of the vibratory device 537 so as to pass downwardly through the interior of the vessel 520 past the window 528. During the passage through the energy receiving zone the particulate material may be acted upon for the carrying forth of any known thermolytic process whereupon the so-treated particulate material is collected in hopper 538 so as to be deposited upon conveyor 539 so as to be discharged from the vessel 520. It will be understood that the means indicated generally at 540 comprises means for establishing an air lock surrounding the feed conveyor 536 and removal conveyor 539 and is such that it may be utilized to render the impure atmosphere of the processor 520 superatmospheric, or subatmospheric.

FIG. 7 is directed to still another embodiment of the present invention wherein the processor vessel is indicated generally at 720 and will be understood to be substantially analogous to the processor vessel 20 with the exception that the upper portion of the vessel is provided with a condensate collection means, indicated generally at 721 comprising a rod, pipe, or the like 722 upon which a condensable substance 723 has condensed as a solid from vapors emanating, under the influence of the concentrated radiant energy, from the material entering the processor vessel 720 through conduit 732. As will be appreciated from the arrow adjacent the end of the condensed material 723 such condensed material is recovered from the processor vessel 720 by passage of the condensing member, or nucleus 722 through the processor 720.

Turning now to FIG. 8 with respect to still another embodiment of the invention it will be seen that a processor vessel indicated generally at 820 is provided with solar energy entry windows 828 and 828' and wherein stock material 821 in the form of a rod, pipe, or the like is passed downwardly through the top of the vessel 820 and subjected to solar energy entering through the window 828 so as to form a sensile "drop" 822 which flows into the dispersion producing means 834 and then is subsequently dispersed downwardly as droplets of predetermined size so as to pass in energy absorption relationship with solar energy entering through the window 828'. It will be noted that in the embodiment of FIG. 8 the dispersion producing means 834 is, as in the other embodiments not subjected to direct solar energy impingement.

With respect to FIG. 9 it will be seen that still another embodiment of the present invention comprises a processor vessel 920 substantially analogous to the processor vessel 820 and reasonably analogous in the operation thereof with one major distinction. In this latter regard, condensate nuclei means 922 is provided beneath the dispersion producing means 934 for collecting a fraction that is predominant in the lower region of the processor vessel 920.

Finally, with reference to FIG. 11 it will be understood that an otherwise conventional rotary kiln is provided with a processor vessel substantially analogous to the vessel 520 of FIG. 5 and wherein a discharge conduit thereof as indicated at 539', understood to be analogous to the discharge means 539 of the processor of FIG. 5 augments or provides the feed material into the kiln, which may comprise a high temperature kiln such as used for the production of cement so as to provide a solar fueled kiln or augment the heat input necessary for operating a fossil fueled rotary kiln.

It will be understood that in the case of operating an apparatus as schematically shown in FIG. 11 the gases would most probably only be removed through the normal kiln outlet as opposed to exhausting fumes directly from the processing vessel 520.

To demonstrate the present invention an experimental processor vessel approximately 2.5 feet in diameter and approximately 11 feet high was constructed. The generally cylindrical wall of the vessel was provided with five vertically disposed spaced-apart rectangular 3 KW quartz iodide lamps to provide 15 KW input to the processor. It will be understood that the periphery of the face of each lamp was in sealed relation to the contiguous wall of the vessel and thus each lamp constituted one of a plurality of "windows" analogous to the window 28 of processor 20. The vessel was provided with a plurality of air inlets adjacent the bottom and fitted with an exhaust fan having a capability of exhausting about 100 cubic feet of air per minute. A downardly falling dispersion of impure water was created within the vessel adjacent the top by means of a spray nozzle so as to introduce distilland as a falling column of raindrops. The impure water was introduced at a rate of about 8 pounds per minute. In a typical 5 minute run of this processor about 0.32 pounds of pure water was recovered from vapor from the top of the vessel. At the 15 KW input this represents an efficiency of about 40% energy conversion.

Data collected from a series of runs clearly demonstrated the benefits to be derived from the apparatus of the present invention for carrying forth direct incident solar spectrum promoted thermolytic processes.

Although the exemplary embodiments of the apparatus illustrated are generally cylindrical elongated vessels it will be understood that processors constructed in accordance with the invention may be of virtually unlimited geometrical configuration as long as the vessel interior-solar energy window-dispersion means relationship is such that permits carrying forth the intended thermolytic process wherein solar energy for the process is directly absorbed by the liquid or solid dispersion phase, and energy not so absorbed is re-radiated from the interior walls of the processor at preselected wavelengths for absorption by the dispersion.

With respect to selective separation of compounds, or compositions, from compositions in a processor of the present invention, it will be understood that the interior wall of the processor may be constructed to have an emissivity which is high in certain preselected wavelengths. These wavelengths would be selected on the basis of the absorption characteristics of the particular material being thermolytically processed so as to maximize absorption of energy re-radiated from the walls. As illustrated, a number of vessels may be operatively associated, in parallel or series, and wherein individual vessels may be constructed so as to have varying preselected wall re-radiating characteristics. In addition, varying the wall re-radiation characteristics of selected portions of a single processor vessel is within the scope of the invention.

It will be appreciated that normal black body radiation, re-radiating from the processor walls, would be general whereas a particular thermolytic process might be enhanced, such as for example in fractional distillation, by preselection of the spectral re-radiation of the processor walls.

In fact, the preselection of the wall re-radiation spectra enhances the selected thermolytic process by substituting longer wavelength energy for energy that has already been absorbed from the incident sunlight.

Although not specifically discussed heretofore, it will be appreciated that the present invention is particularly suited to thermolytic processes, such as including a pyrolysis process for production of synthesis gas, for example, wherein a particulate solid substance within a liquid comprises the droplets comprising the downwardly falling inner phase of the dispersion.

In such a utilization of the present invention the particle inside the drop, e.g., a carbonaceous particle within water, when subjected to the intense solar energy entering the window would cause the explosive disintegration of the drop and wherein establishment of requisite stoichiometric relation between the solid particle and liquid can provide an efficient means for driving forward a reaction, such as for production of synthesis gas.

I claim:

1. Apparatus for providing direct thermolytic and photolytic processing of a substance by interaction by absorption between a free-flowing, rainfall dispersion of the substance and electromagnetic radiant solar energy in a concentration sufficient to carry out said processing comprising:

a vessel having a chamber generally closed to the ambient atmosphere, said chamber having opaque walls;
- means for producing a free-flowing, rainfall dispersion of the substance to be thermolytically and photolytically processed within the chamber; and
- means for subjecting the dispersion produced to thermolytic and photolytic processing by interaction by absorption with said direct incident concentrated electromagnetic solar energy to produce a resultant material from the substance, said means including an entry window.

2. The apparatus of claim 1 wherein the means for producing a dispersion produces a gravitationally descending dispersion.

3. The apparatus of claim 1 wherein the means for producing a dispersion produces a liquid-in-gas dispersion.

4. The apparatus of claim 1 wherein the means for producing a dispersion produces a particulate solid-in-gas dispersion.

5. The apparatus of claim 1 wherein the means for producing a dispersion produces a liquid/particulate solid-in-gas dispersion.

6. The apparatus of claim 1 wherein the vessel chamber includes interior wall portions constructed to re-radiate energy at a preselected wavelength.

7. The apparatus of claim 1 further including pressure equalization means.

8. The apparatus of claim 1 wherein the means for subjecting a dispersion produced to direct incident concentrated solar energy comprises window means transmissive to radiation in the 0.2 to 2.8 micron band.

9. The apparatus of claim 1 further including means for recovering said resultant material as a product directly from the vessel.

10. The apparatus of claim 9 wherein said means for subjecting the dispersion produced to thermolytic and/or photolytic processing further physically separates at least one constituent of said substance and wherein said resultant material is at least one constituent of said substance.

11. The apparatus of claim 8 wherein said window means are located on a generally vertically disposed wall of the chamber.

12. In a method for providing direct thermolytic and photolytic processing of a substance by interaction by absorption between a free-flowing, rainfall dispersion of the substance and electromagnetic radiant solar energy within a vessel, the improvement comprising:

- establishing a free-flowing, rainfall dispersion within the vessel of the substance to be processed;
- directing electromagnetic solar energy into the vessel in a concentration sufficient to carry out said processing;
- thermolytically and photolytically processing by interacting by absorption the dispersed substance with said direct electromagnetic solar energy to produce a resultant material from the substance;
- absorbing said energy not initially absorbed by the dispersed substance in the walls of the vessel; and
- re-radiating to the dispersed substance in a preselected spectrum said concentrated energy absorbed by the walls.

13. The method of claim 12 wherein the step of establishing said free-flowing, rain-fallike dispersion includes the step of maintaining said dispersion away from the walls of the vessel.

14. The method of claim 13 wherein the separating of at least one constituent of the substance further includes the step of chemically decomposing the substance.

15. The method of claim 13 wherein the separating of at least one constituent of the substance further includes the step of physically and/or chemically combining the separated substance with a second substance.

16. The method of claim 12 further including the step of recovering said resultant material as a product directly from the vessel.

17. The method of claim 16 wherein said thermolytic and/or photolytic processing further includes physically separating at least one constituent of said substance and wherein said resultant material is at least one constituent of said substance.

* * * * *

UNITED STATES PATENT AND TRADEMARK OFFICE
CERTIFICATE OF CORRECTION

PATENT NO. : 4,338,922
DATED : July 13, 1982
INVENTOR(S) : WALTER T. MOORE

It is certified that error appears in the above—identified patent and that said Letters Patent is hereby corrected as shown below:

Claim 14, line 1, change "13" to --17--.

Claim 15, line 1, change "13" to --17--.

Signed and Sealed this

Twenty-sixth Day of October 1982

[SEAL]

Attest:

GERALD J. MOSSINGHOFF

Attesting Officer      Commissioner of Patents and Trademarks